United States Patent
Tamaizumi

(10) Patent No.: US 9,457,839 B2
(45) Date of Patent: Oct. 4, 2016

(54) STEERING SYSTEM

(71) Applicant: JTEKT CORPORATION, Osaka-shi, Osaka (JP)

(72) Inventor: Terutaka Tamaizumi, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/693,119

(22) Filed: Apr. 22, 2015

(65) Prior Publication Data

US 2015/0329140 A1   Nov. 19, 2015

(30) Foreign Application Priority Data

May 16, 2014   (JP) .................. 2014-102489

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |

(Continued)

(52) U.S. Cl.
CPC .............. *B62D 6/003* (2013.01); *B62D 5/046* (2013.01); *B62D 5/0463* (2013.01); *B62D 5/0466* (2013.01); *B62D 6/008* (2013.01); *B62D 6/02* (2013.01); *B62D 15/025* (2013.01)

(58) Field of Classification Search
CPC ........ B62D 6/003; B62D 5/046; B62D 6/02; B62D 15/025; B62D 5/0466; B62D 6/008; B62D 5/0463

USPC .......................................................... 701/42
See application file for complete search history.

(56) References Cited

U.S. PATENT DOCUMENTS

| | | |
|---|---|---|
| 2002/0060538 A1 | 5/2002 | Hara et al. |
| 2007/0021889 A1* | 1/2007 | Tsuchiya ................ B62D 1/286 701/41 |
| 2008/0021614 A1 | 1/2008 | Endo et al. |

FOREIGN PATENT DOCUMENTS

| | | |
|---|---|---|
| DE | 198 34 454 A1 | 2/1999 |
| EP | 1 127 775 A1 | 8/2001 |

(Continued)

OTHER PUBLICATIONS

Jan. 20, 2016 Search Report issued in European Patent Application No. 15165495.1.

Primary Examiner — Calvin Cheung
Assistant Examiner — Paula L Schneider
(74) Attorney, Agent, or Firm — Oliff PLC

(57) ABSTRACT

A steering system includes a motor control apparatus that controls driving of a motor based on an assist command value. The motor control apparatus includes an angle command value calculating unit that calculates an angle command value based on an input value including a steering torque, and calculates an assist component through execution of angle feedback control allowing a turning angle of a vehicle to follow the angle command value. The motor control apparatus calculates the assist command value based on the assist component. The motor control apparatus also calculates a correction value based on a deviation between a yaw rate of the vehicle and a yaw rate command value. An input value for the angle command value calculating unit is corrected based on the correction value.

6 Claims, 5 Drawing Sheets

(51) Int. Cl.
   *G06F 17/00* (2006.01)
   *G06F 19/00* (2011.01)
   *B62D 5/04* (2006.01)
   *B62D 6/02* (2006.01)
   *B62D 15/02* (2006.01)

(56) References Cited

FOREIGN PATENT DOCUMENTS

EP         2 495 156 A1    9/2012
JP         2012-232704 A  11/2012

* cited by examiner

STEERING SYSTEM

INCORPORATION BY REFERENCE

The disclosure of Japanese Patent Application No. 2014-102489 filed on May 16, 2014 including the specification, drawings and abstract is incorporated herein by reference in its entirety.

BACKGROUND OF THE INVENTION

1. Field of the Invention

The invention relates to a steering system that assists a driver's vehicle traveling by applying an assist force of a motor to a steering mechanism.

2. Description of Related Art

An electric power steering system of this type performs what is called lane keeping assist control in which an assist force from a motor is applied to a steering mechanism so that a vehicle can easily kept traveling in a lane in which the vehicle is traveling (see Japanese Patent Application Publication No. 2012-232704 (JP 2012-232704 A)). The electric power steering system described in JP 2012-232704 A includes an imaging apparatus, a motor, and a control apparatus. The imaging apparatus images an area ahead of a vehicle. The motor applies an assist force to the steering mechanism of the vehicle. The control apparatus controls driving of the motor. The control apparatus acquires information on a lane in the traveling direction of the vehicle from image data on the area ahead of the vehicle acquired by the imaging apparatus. The control apparatus then sets a target traveling line based on the lane information acquired. When the actual traveling line of the vehicle deviates from the target traveling line, the control apparatus controls the driving of the motor so as to apply, to the steering mechanism, such an assist force that recovers the actual traveling line of the vehicle to the target traveling line.

A frictional force, an inertia force, and the like generated in the steering mechanism when the steering mechanism is driven vary with vehicles. Thus, for two vehicles between which the frictional force, the inertia force, and the like generated in the steering mechanism vary, the assist force actually applied to the steering mechanism varies between the vehicles even when the driving control of the motor is similarly performed. The variation in assist force in turn varies the response of lane keeping assist control, making the driver feel uncomfortable.

The above-described problem is not limited to the steering system that performs the lane keeping assist control. The problem is common to steering systems that performs various types of driving assist control that assist the driver's vehicle traveling by applying the assist force of the motor to the steering mechanism.

SUMMARY OF THE INVENTION

An object of the present invention is to provide a steering system that allows suppressing a variation in the response of driving assist control.

According to an aspect of the present invention, a steering system includes a motor that applies an assist force to a steering mechanism of a vehicle and a motor control unit that controls driving of the motor based on an assist command value corresponding to a target value for an output torque of the motor. The motor control unit includes an angle command value calculating unit that calculates an angle command value corresponding to a target value for a turning angle for a turning wheel based on an input value including a steering torque applied to a steering wheel of the vehicle in association with a steering operation, an angle feedback control unit that calculates an assist component through execution of angle feedback control allowing an actual turning angle for the turning wheel to follow the angle command value, an assist command value calculating unit that calculates the assist command value based on the assist component, a state quantity command value setting unit that sets a state quantity command value corresponding to a target value for a state quantity indicative of a traveling state of the vehicle, and a correction value calculating unit that calculates a correction value based on a deviation between an actual state quantity of the vehicle and the state quantity command value. An input value for the angle command value calculating unit is corrected based on the correction value.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
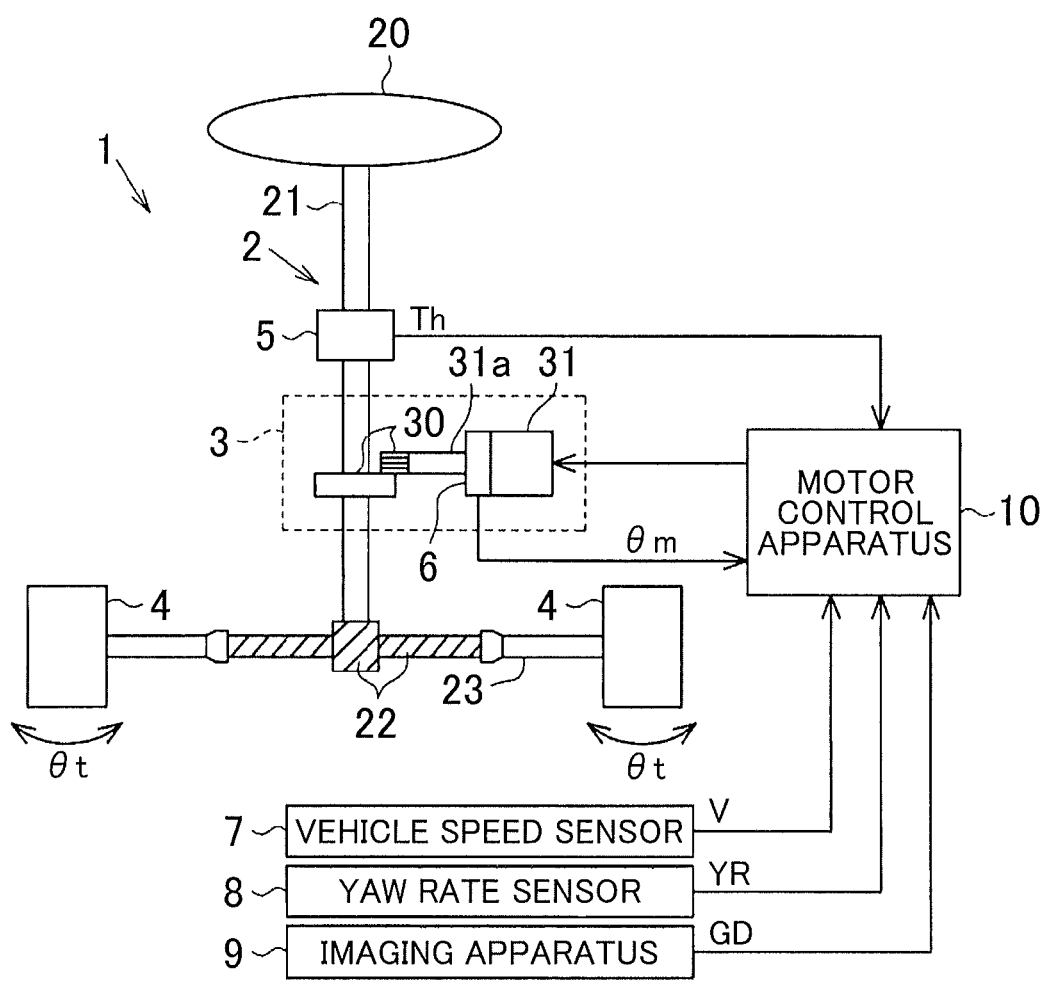
FIG. 1 is a block diagram depicting a general configuration of a steering system of an embodiment.

An embodiment of a steering system will be described below. As depicted in FIG. 1, a steering system 1 includes a steering mechanism 2 and an assist mechanism 3. The steering mechanism 2 steers turning wheels 4 based on operation of a steering wheel 20 by a driver. The assist mechanism 3 assists the driver's steering operation.

The steering mechanism 2 includes a steering shaft 21 serving as a rotating shaft for the steering wheel 20. A lower end of the steering shaft 21 is coupled to a rack shaft 23 via a rack and pinion mechanism 22. In the steering mechanism 2, when the steering shaft 21 rotates in conjunction with the operation of the steering wheel 20 by the driver (steering operation), the rotational motion is converted into reciprocating linear motion in the axial direction of the rack shaft 23 via the rack and pinion mechanism 22. The axial reciprocating linear motion of the rack shaft 23 changes a turning angle $\theta t$ for the turning wheels 4 coupled to the rack shaft 23 at respective opposite ends thereof to change the traveling direction of the vehicle.

The assist mechanism 3 includes a motor 31 coupled to the steering shaft 21 via a speed reducer 30. The motor 31 includes a brushless motor. The assist mechanism 3 transmits rotation of an output shaft 31a of the motor 31 to the steering shaft 21 via the speed reducer 30 to apply torque to the steering shaft 21, thus assisting the driver's steering operation.

The steering system 1 is provided with various sensors that detect the operation amount of the steering wheel 20 and the state quantities of the vehicle. For example, the steering shaft 21 is provided with a torque sensor 5 that detects a steering torque Th applied to the steering wheel 20 when the driver performs the steering operation. The positive sign and the negative sign for the steering torque Th are defined such that the steering torque applied in the direction of steering to the right is positive, whereas the steering torque applied in the direction of steering to the left is negative. The motor 31 is provided with a rotation angle sensor 6 that detects a rotation angle θm. The vehicle is provided with a vehicle speed sensor 7, a yaw rate sensor 8, and an imaging apparatus 9.

The vehicle speed sensor 7 detects a vehicle speed V. The yaw rate sensor 8 detects the yaw rate YR of the vehicle. The imaging apparatus 9 images an area ahead of the vehicle. The positive sign and the negative sign for the yaw rate YR in the present embodiment are defined such that the direction in which the yaw angle of the vehicle changes at the time of steering to the right is positive, whereas the direction in which the yaw angle of the vehicle changes at the time of steering to the left is negative. The imaging apparatus 9 includes a CCD camera and outputs image data GD on the imaged area ahead of the vehicle. The output is loaded into a motor control apparatus (motor control unit) 10. The motor control apparatus 10 controls driving of the motor 31 based on various state quantities detected by the sensors 5 to 8 and the image data GD on the area ahead of the vehicle imaged by the imaging apparatus 9.

Figure 2:
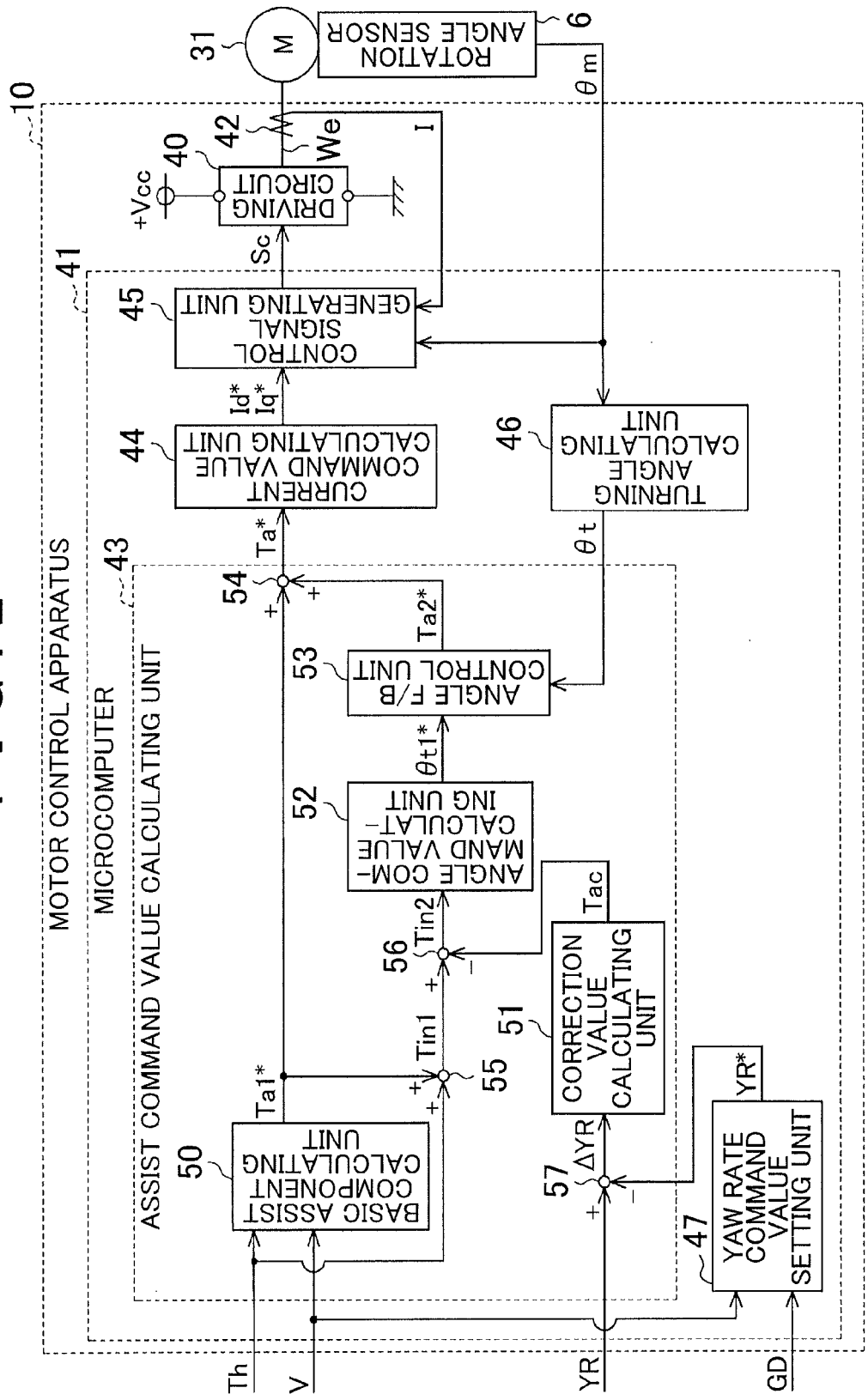
FIG. 2 is a block diagram depicting an electrical configuration of the steering system of the embodiment.

As depicted in FIG. 2, the motor control apparatus 10 includes a driving circuit 40 and a microcomputer 41. The driving circuit 40 drives the motor 31. The microcomputer 41 controls driving of the motor 31 via the driving circuit 40. The driving circuit 40 includes a well-known inverter circuit that converts a direct current supplied by a power source (power voltage "+Vcc") such as an in-vehicle battery into an three-phase (U phase, V phase, and W phase) alternating current. The driving circuit 40 generates three-phase alternating current based on a control signal Sc from the microcomputer 41 and supplies the generated three-phase alternating current to the motor 31 via feeding lines We corresponding to the respective phases. The feeding lines We are each provided with a current sensor 42 that detects a current value I for the corresponding phase supplied to the motor 31. In FIG. 2, the feeding lines We for the respective sensors are collectively illustrated as one feeding line, and the current sensors 42 for the respective phases are also collectively illustrated as one current sensor. Outputs from the current sensors 42 are loaded into the microcomputer 41.

The microcomputer 41 generates the control signal Sc based on the steering torque Th, the vehicle speed V, a yaw rate YR, a motor rotation angle θm, and current values I for the respective phases detected by the sensors 5 to 8, and the image data GD output by the imaging apparatus 9.

Specifically, the microcomputer 41 includes an assist command value calculating unit 43, a current command value calculating unit 44, a control signal generating unit 45, a turning angle calculating unit 46, and a yaw rate command value setting unit 47. In the embodiment, the yaw rate command value setting unit 47 corresponds to a state quantity command value setting unit.

Figure 3:
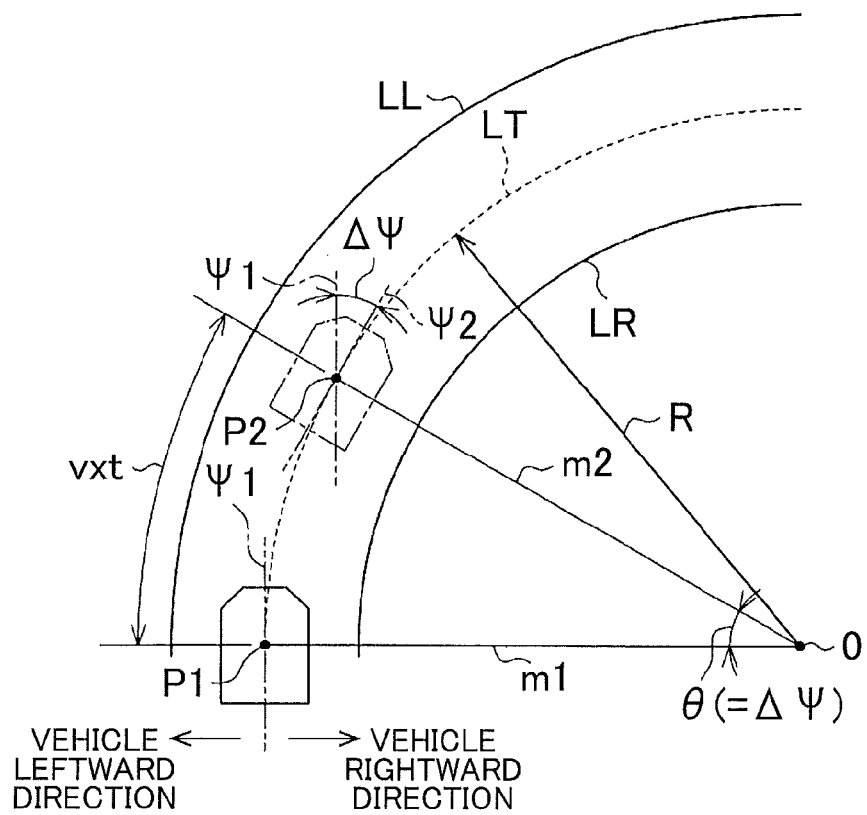
FIG. 3 is a diagram illustrating an example of a method for setting a yaw rate command value for the steering system of the embodiment.

The yaw rate command value setting unit 47 calculates the yaw rate command value YR* based on the vehicle speed V and the image data GD on the area ahead of the vehicle. The yaw rate command value YR* corresponds to a target value for the yaw rate of the vehicle, which allows the vehicle to keep traveling in a lane in which the vehicle is traveling. For example, as depicted in FIG. 3, the vehicle is assumed to be located at a position P1 on a solid line. At this time, the yaw rate command value setting unit 47 executes image processing such as a binarization process for the image data GD to acquire information on a left lane marking line LL and a right lane marking line LR printed on the lane which is ahead of the vehicle and in which the vehicle is traveling. Based on the acquired information on the left lane marking line LL and the right lane marking line LR, the yaw rate command value setting unit 47 sets a center line between the left lane marking line LL and the right lane marking line LR, that is, a dashed line in FIG. 3, to be a target traveling line LT. In this regard, if the yaw rate command value setting unit 47 determines that the target traveling line LT is a curve, the unit calculates a radius of curvature R of the target traveling line LT and sets the yaw rate command value YR* based on the calculated radius of curvature R and the vehicle speed V. The yaw rate command value YR* is set, for example, as follows.

A calculation period at which the yaw rate command value setting unit 47 calculates the yaw rate command value YR* is denoted by "t." If the vehicle travels at the vehicle speed V from the current position P1 on the target traveling line LT until a time t elapses, the vehicle reaches a position P2 on a long dashed double-short dashed line in FIG. 3 when the time t elapses. In this case, the traveling distance of the vehicle from the position P1 to the position P2, that is, the length of a dashed circular arc connecting the position P1 and the position P2 together, can be determined by multiplying the vehicle speed V by the time t. Thus, when a straight line connecting the central point O of the radius of curvature R and the vehicle position P1 is denoted by "m1" and a straight line connecting the central point O of the radius of curvature R and the vehicle position P2 is denoted by "m2", the angle θ between the straight line m1 and the straight line m2 can be determined by Expression (1).

$$\theta = 360° \times V \times t / (2 \times \pi \times R) \quad (1)$$

On the other hand, to allow the vehicle to travel on the target traveling line LT from the position P1 to the position P2, a yaw angle Ψ2 of the vehicle at the position P2 should be a value obtained by changing a yaw angle Ψ1 of the vehicle at the position P1 by an angle ΔΨ. In this regard, the angle ΔΨ is equal to an angle θ. That is, the angle ΔΨ can be calculated using the right side of Expression (1). A value resulting from division of the angle ΔΨ by the time t is the yaw rate of the vehicle that enables the traveling line of the vehicle to be changed along the target traveling line LT. That is, the yaw rate command value YR* can be determined by Expression (2).

$$YR^* = 360° \times V / (2 \times \pi \times R) \quad (2)$$

The yaw rate command value setting unit 47 calculates the yaw rate command value YR* at a predetermined calculation period using, for example, such a calculation method as described above, and then adds a positive or negative sign to the calculated yaw rate command value YR*. Specifically, when the target traveling line LT is curved toward the right of the vehicle as viewed from the current position P1 of the vehicle, the yaw rate command value setting unit 47 sets the positive sign for the yaw rate command value YR*. When the target traveling line LT is curved toward the left of the vehicle as viewed from the current position P1 of the vehicle, the yaw rate command value setting unit 47 sets the negative sign for the yaw rate command value YR*. If the yaw rate command setting unit determines that the target traveling line LT is a straight line, the unit sets the yaw rate command value YR* to "0". As depicted in FIG. 2, the yaw rate command value setting unit 47 outputs the thus calculated yaw rate command value YR* to the assist command value calculating unit 43.

The turning angle calculating unit 46 calculates the actual turning angle θt for the turning wheels 4 based on the motor rotation angle θm. In the steering system 1 of the present embodiment, the output shaft 31a of the motor 31 is mechanically coupled to the steering shaft 21 via the speed reducer 30, as depicted in FIG. 1. Thus, the motor rotation angle θm is correlated with the rotation angle of the steering shaft 21. Therefore, the motor rotation angle θm is also correlated with the turning angle θt for the turning wheels 4. The turning angle calculating unit 46 utilizes the correlations to calculate the actual turning angle θt for the turning wheels 4 from the motor rotation angle θm. In the present embodiment, the turning angle θt is set using, as a reference angle ("0°"), the rotation angle at which the steering wheel 20 is located in a neutral position. Furthermore, the positive sign and the negative sign for the turning angle θt are defined such that the direction of change at the time of steering to the right is positive, whereas the direction of change at the time of steering to the left is negative. As depicted in FIG. 2, the turning angle calculating unit 46 outputs the calculated actual turning angle θt to the assist command value calculating unit 43.

The assist command value calculating unit 43 calculates an assist command value Ta* based on the steering torque Th, the vehicle speed V, the yaw rate YR, the yaw rate command value YR*, and the actual turning angle θt. The assist command value Ta* corresponds to a target value for an output torque of the motor 31. The assist command value Ta* in the present embodiment is defined such that a direction in which the assist force for steering to the right is applied to the steering shaft 21 is positive, whereas a direction in which the assist force for steering to the left is applied to the steering shaft 21 is negative. The assist command value calculating unit 43 includes a basic assist component calculating unit 50, a correction value calculating unit 51, an angle command value calculating unit 52, and an angle feedback (F/B) control unit 53.

The basic assist component calculating unit 50 calculates a first assist component Ta1* based on the steering torque Th and the vehicle speed V. The first assist component Ta1* is a basic component of the assist command value Ta*. The basic assist component calculating unit 50, for example, sets the absolute value of the first assist component Ta1* such that the absolute value increases as the absolute value of the steering torque Th increases or as the vehicle speed V reduces. The basic assist component calculating unit 50 outputs the calculated first assist component Ta1* to adders 54, 55. The adder 55 adds the steering torque Th to the first assist component Ta1* calculated by the basic assist component calculating unit 50 to obtain an input value Tin1 (Ta1*+Th), and outputs the calculated input value Tin1 to a subtractor 56.

On the other hand, the assist command value calculating unit 43 has a subtractor 57 that subtracts the yaw rate command value YR* from the actual yaw rate YR to obtain a deviation ΔYR (=YR−YR*). The subtractor 57 outputs the calculated deviation ΔYR to the correction value calculating unit 51.

The correction value calculating unit 51 calculates a correction value Tac based on the deviation ΔYR. The correction value calculating unit 51 sets the absolute value of the correction value Tac such that the absolute value increases as the absolute value of the deviation ΔYR increases, for example, based on a map depicted in FIG. 4. As depicted in FIG. 2, the correction value calculating unit 51 outputs the calculated correction value Tac to the subtractor 56. The subtractor 56 performs correction in which the correction value Tac is subtracted from the input value Tin1, and outputs a corrected input value Tin2 (=Tin1−Tac) to the angle command value calculating unit 52.

The angle command value calculating unit 52 calculates an angle command value θt1* from the input value Tin2 based on an ideal model. The angle command value θt1* corresponds to a target value for the turning angle θt for the turning wheels 4. The ideal model is obtained by modeling the results of measurement, through experiments or the like, of the ideal turning angle θt according to the uncorrected input value Tin1, that is, the sum of the steering torque Th and the first assist component Ta1*. The angle command value calculating unit 52 outputs the angle command value θt1* calculated based on the ideal model to the angle feedback (FB) control unit 53.

In addition to the angle command value θt1*, the actual turning angle θt is input to the angle feedback control unit 53. To allow the actual turning angle θt to follow the angle command value θt1*, the angle feedback control unit 53 performs angle feedback control based on the deviation between the actual turning angle θt and the angle command value θt1 to calculate a second assist component Ta2*, and outputs the calculated second assist component Ta2* to the adder 54. The adder 54 adds the first assist component Ta1* and the second assist component Ta2* together to determine the assist command value Ta*(=Ta1*+Ta2*). The assist command value calculating unit 43 outputs the thus calculated assist command value Ta* to the current command value calculating unit 44.

The current command value calculating unit 44 calculates a d axis current command value Id* and a q axis current command value Iq* based on the assist command value Ta*. The d axis current command value Id* and the q axis current command value Iq* correspond to a target value for a current supplied to the motor 31 in a d/q coordinate system. Specifically, the current command value calculating unit 44 calculates the q axis current command value Iq* based on the assist command value Ta* and outputs the calculated q axis current command value Iq* to the control signal generating unit 45. In the present embodiment, the d axis current command value Id* is set to "0", and the current command value calculating unit 44 also outputs the d axis current command value Id* to the control signal generating unit 45.

In addition to the d axis current command value Id* and the q axis current command value Iq*, the current values I for the respective phases and the motor rotation angle θm are input to the control signal generating unit 45. Based on these values, the control signal generating unit 45 generates the control signal Sc. Specifically, the control signal generating unit 45 maps the current values I for the respective phases to the d/q coordinate system based on the motor rotation angle θm to calculate a d axis current value and a q axis current value that are actual current values for the motor 31 in the d/q coordinate system. Subsequently, to allow the actual d axis current value to follow the d axis current command value Id* and to allow the actual q axis current value to follow the q axis current command value Iq*, the control signal generating unit 45 performs current feedback control based on the deviation between the actual d axis current value and the d axis current command value Id* and the deviation between the actual q axis current value and the q axis current command value Iq* to generate the control signal Sc. The microcomputer 41 outputs the thus calculated control signal Sc to the driving circuit 40. Thus, the driving circuit 40 supplies a three-phase alternating current according to the d axis current command value Id* and the q axis current command value Iq* to the motor 31 via the feeding lines We to drive the motor 31. Accordingly, assist control is performed in which the motor 31 applies an assist force according to the assist command value Ta* to the steering shaft 21.

According to the above-described configuration, operations and effects as described in (1) to (4) can be achieved.

(1) The second assist component Ta2*, obtained through the angle feedback control, is included in the assist command value Ta*. Thus, when the assist force based on the assist command value Ta* is applied to the steering shaft 21, the actual turning angle θt follows the angle command value θt1*. If a frictional force, an inertia force, or the like is generated in the steering mechanism 2 when the steering mechanism 2 is driven as a result of the angle feedback control, the assist force is adjusted such that the actual turning angle θt follows the angle command value θt1*. As a result, the assist force can be applied to the steering mechanism 2 so that the frictional force, the inertia force, or the like, which acts on the steering mechanism 2, is cancelled. This suppresses a variation in assist force among vehicles.

(2) In the present embodiment, an ideal model is created which indicates the relation between the angle command value θt1* and the sum of the steering torque Th and the first assist component Ta1*, and the angle command value θt1* is set based on the ideal model. Thus, a change in actual turning angle θt according to the sum of the steering torque Th and the first assist component Ta1* can be determined using the ideal model. That is, the behavior of the vehicle according to the driver's steering operation can be set using the ideal model. Therefore, a desired steering feel can be achieved by adjusting the ideal model as needed.

Figure 5:
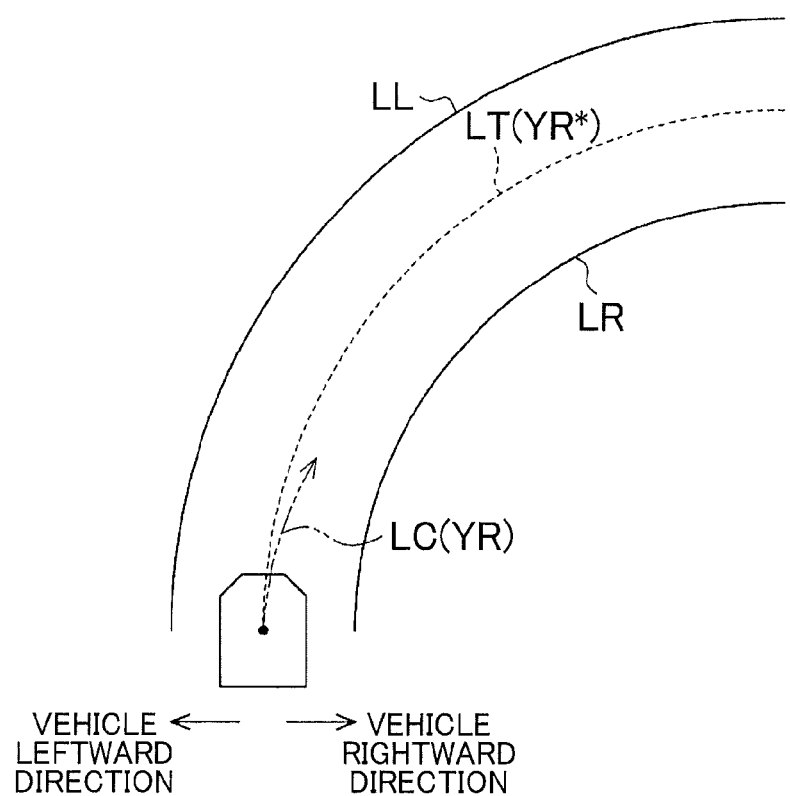
FIG. 5 is a diagram schematically depicting an example of vehicle traveling.

(3) If, for example, the actual yaw rate YR of the vehicle has a value larger than the yaw rate command value YR*, as depicted in FIG. 5, a traveling line LC of the vehicle deviates from the target traveling line LT toward the right of the vehicle as depicted by a long dashed double-short dashed line in FIG. 5. In such a case, the deviation ΔYR between the actual yaw rate YR and the yaw rate command value YR* has a positive value. Thus, the correction value Tac calculated by the correction value calculating unit 51 is set to a positive value. Therefore, the input value Tin2 decreases, changing the angle command value θt1* calculated by the angle command value calculating unit 52 in the negative direction. That is, the angle command value θt1* changes in the direction of steering to the left. At this time, the angle feedback control unit 53 sets the second assist component Ta2* so as to allow the actual turning angle θt to follow the changed angle command value θt1*. Thus, the second assist component Ta2* is set to a negative value. Therefore, the assist command value Ta* decreases, changing the assist force applied to the steering shaft 21 in the negative direction. Due to the change in assist force, a steering reaction force that prevents steering of the steering wheel 20 to the right, in other words, the steering reaction force that prevents an increase in the actual yaw rate YR acts on the steering mechanism 2.

Figure 4:
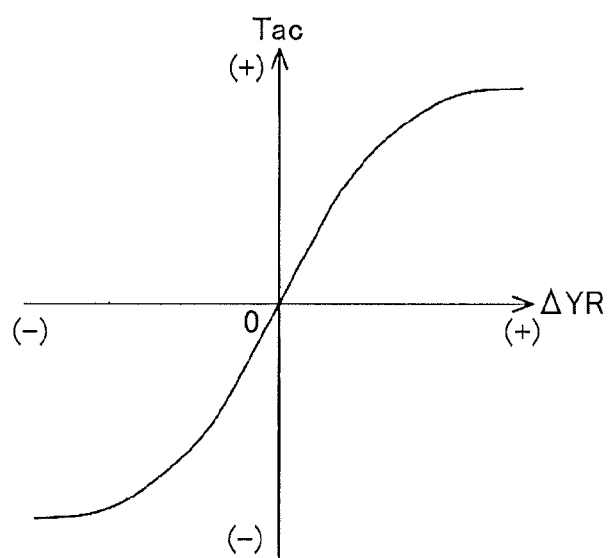
FIG. 4 is a map depicting the relation between a correction value Tac and a deviation $\Delta YR$ between an actual yaw rate YR of a vehicle and a yaw rate command value YR*.
Figure 6:
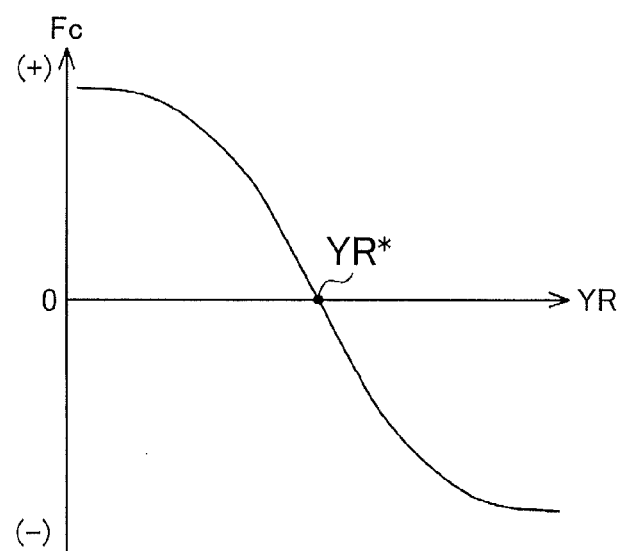
FIG. 6 is a graph depicting the relation between the actual yaw rate YR of the vehicle and a steering reaction force Fc in the steering system of the embodiment.

Furthermore, in the present embodiment, the absolute value of the correction value Tac increases as the deviation ΔYR between the actual yaw rate YR and the yaw rate command value YR* increases as depicted in FIG. 4. Thus, the angle command value θt1* changes more significantly. That is, the second assist component Ta2* changes more significantly to increase the steering reaction force. FIG. 6 depicts the relation between a steering reaction force Fc and the actual yaw rate YR. The positive sign and the negative sign for the steering reaction force Fc are defined such that the steering reaction force applied in the direction of steering to the right is positive, whereas the steering reaction force applied in the direction of steering to the left is negative. As depicted in FIG. 6, the steering reaction force Fc increases in the negative direction as the actual yaw rate YR increases above the yaw rate command value YR*. That is, the steering reaction force Fc increases in such a direction that steering of the steering wheel 20 to the right is prevented. Thus, the actual yaw rate YR can be recovered to the yaw rate command value YR*. Furthermore, the steering reaction force Fc increases in such a direction that steering of the steering wheel 20 to the left is prevented as the actual yaw rate YR decreases below the yaw rate command value YR*. Thus, also in this case, the actual yaw rate YR can be recovered to the yaw rate command value YR*. Such a steering reaction force Fc allows natural achievement of such steering that causes the actual yaw rate YR to follow the yaw rate command value YR*. That is, the driver's vehicle steering can be assisted such that the traveling line of the vehicle to follow the target traveling line LT. Consequently, lane keeping assist control that allows the vehicle to keep traveling in the lane in which the vehicle is traveling can be achieved.

(4) The configurations described in (1) to (3) allows performing the lane keep assist control while suppressing a variation in assist force among vehicles. This allows suppressing a variation in the response of driving assist control among vehicles.

The above-described embodiment may also be implemented in the following form.

The yaw rate command value setting unit 47 in the above-described embodiment sets the yaw rate command value YR* based on Expression (2) using the radius of curvature R of the target traveling line LT and the vehicle speed V. However, the method for setting the yaw rate command value YR* can be changed as needed as long as the yaw rate command value setting unit 47 sets the yaw rate command value YR* based on the target traveling line LT and the vehicle speed V.

The correction value calculating unit 51 in the above-described embodiment sets the center line between the left and right lane marking lines LL and LR to be the target traveling line LT. However, the method for setting the target traveling line LT is not limited to this. For example, the target traveling line LT may be set based on one of the lane marking lines LL and LR.

In the above-described embodiment, the imaging apparatus 9 is used as a traveling lane detecting unit that detects information on the lane in which the vehicle is traveling. However, the traveling lane detecting unit is not limited to this. For example, a car navigation apparatus and a GPS apparatus may be used as a traveling lane detecting unit to acquire information on the lane in which the vehicle is traveling based on road information stored in advance in the car navigation apparatus and the current position of the vehicle detected by a GPS (Global Positioning System).

The correction value calculating unit 51 in the above-described embodiment sets the absolute value of the correction value Tac such that the absolute value increases as the absolute value of the deviation ΔYR increases, based on the map depicted in FIG. 4. However, the method for setting the correction value Tac can be changed as needed. For example, the correction value calculating unit 51 may determine whether or not the absolute value of the deviation ΔYR is equal to or larger than a predetermined threshold (>0). If the correction value calculating unit 51 determines that the absolute value of the deviation ΔYR is equal to or larger than the predetermined threshold, the unit may set the correction value Tac to a preset value (>0). Furthermore, when the relation between the deviation ΔYR and the correction value Tac can be defined by an arithmetic expression, the correction value Tac may be calculated based on the arithmetic expression.

The correction value calculating unit 51 in the above-described embodiment sets the correction value Tac based on the deviation ΔYR between the actual yaw rate YR and the yaw rate command value YR*. However, the correction value Tac may be set based on a state quantity other than the yaw rate that is indicative of the traveling state, for example, the lateral acceleration (lateral G) or turning angle θt of the vehicle. In this case, instead of the yaw rate command value setting unit 47, an appropriate command value calculating unit needs to be provided which calculates a command value for the lateral acceleration or the turning angle θt (state quantity command value) based on the target traveling line LT obtained from the image data GD. Such a configuration allows the input value Tin1 for the angle command value calculating unit 52 to be corrected based on the correction value Tac. Thus, the assist force of the motor is adjusted so as to allow the lateral acceleration or turning angle θt of the vehicle to follow the corresponding command value. The adjustment of the assist force allows the traveling line of the vehicle to follow the target traveling line LT. Consequently, the lane keeping assist control is achieved which allows the vehicle to keep traveling in a lane in which the vehicle is traveling.

Figure 7:
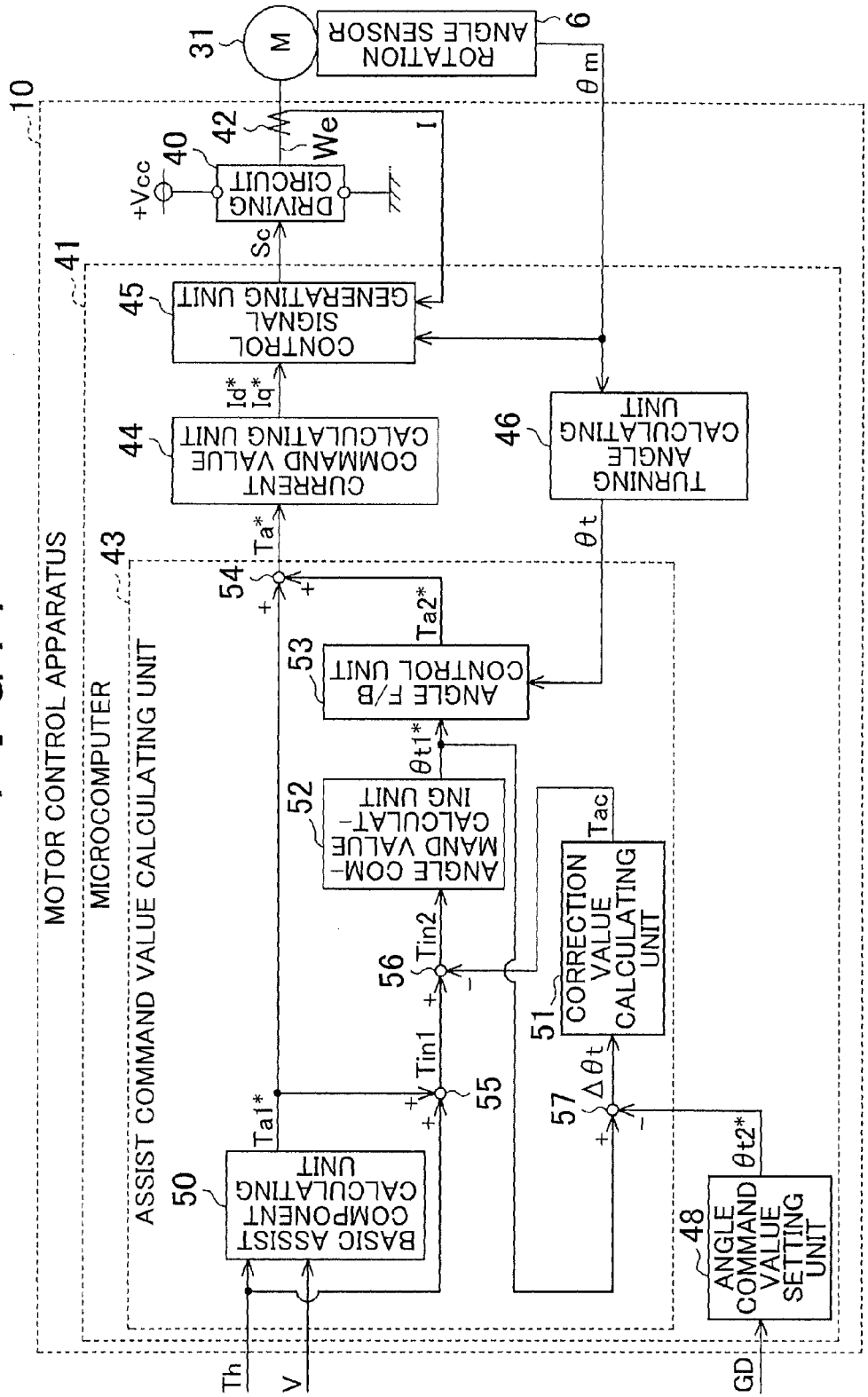
FIG. 7 is a block diagram depicting an electrical configuration of a modification of the steering system.

In the above-described embodiment, the angle feedback control performed by the angle feedback control unit 53 makes the actual turning angle θt approximately equal to the angle command value θt1*. Thus, instead of the method of setting the correction value Tac based on the turning angle θt, a method of setting the correction value Tac based on the angle command value θt1* may be adopted. Specifically, such a configuration as depicted in FIG. 7 is effectively adopted. In FIG. 7, the angle command value θt1* calculated by the angle command value calculating unit 52 is referred to as the "first angle command value" for convenience. As depicted in FIG. 7, the microcomputer 41 in this modification has an angle command value setting unit 48 instead of the yaw rate command value setting unit 47. The angle command value setting unit 48 calculates a second angle command value θt2* based on the image data GD on an area ahead of the vehicle. The second angle command value θt2* is a target value for the turning angle θt of the vehicle that allows the vehicle to keep traveling in a lane in which the vehicle is traveling. In the modification, the angle command value setting unit 48 corresponds to a state quantity command value setting unit. The angle command value setting unit 48, for example, sets the target traveling line LT for the vehicle based on the information on the lane marking lines LL and LR acquired from the image data GD, and sets the second angle command value θt2* corresponding to the radius of curvature R of the target traveling line LT using the map or the like. The subtractor 57 subtracts the second angle command value θt2* set by the angle command value setting unit 48 from the first angle command value θt1* calculated by the angle command value calculating unit 52. Thus, the deviation Δθt (=θt1*−θt2*) between the first angle command value θt1* and the second angle command value θt2* can be calculated. The correction value calculating unit 51 calculates the correction value Tac based on the deviation Δθt calculated by the subtractor 57. Such a configuration eliminates the need for the yaw rate sensor 8 described in the above-described embodiment, that is, the sensor dedicated to calculating the correction value Tac. Therefore, the configuration can be simplified.

The steering system 1 in the above-described embodiment is applicable not only to the steering system for the lane keeping assist control but also to steering systems that perform various types of driving assist control such as slip suppression control that prevents the vehicle from slipping when the vehicle is traveling on a low friction road. When the steering system 1 in the above-described embodiment is used to perform the slip suppression control, for example, the following configuration may be adopted. First, the yaw rate command value setting unit 47 performs a mapping operation based on the radii of curvature R of the lane marking lines LL and LR acquired from the image data GD, by setting the yaw rate command value YR* equal to the ideal yaw rate for the vehicle that is not in a slip state. The subtractor 57 calculates the deviation ΔYR (=YR−YR*) between the actual yaw rate YR and the yaw rate command value YR* as is the case with the above-described embodiment. When the absolute value of the deviation ΔYR is larger than a preset threshold, the correction value calculating unit 51 determines that the vehicle is in the slip state, and then sets the correction value Tac to a predetermined value (>0). In such a configuration, when, for example, the vehicle slips to cause the actual yaw rate YR to deviate from the yaw rate command value YR*, the steering reaction force Fc corresponding to the correction value Tac acts on the steering mechanism 2. That is, counter-steering is automatically performed to allow the slip state of the vehicle to be suppressed.

The angle feedback control unit 53 in the above-described embodiment performs the angle feedback control based on the turning angle θt. However, the angle feedback control may use a rotation angle that can be converted into the turning angle θt, for example, a steering angle.

In the above-described embodiment, the turning angle θt is detected using the rotation angle sensor 6 and the turning angle calculating unit 46. However, the rotation angle detecting unit that detects the turning angle θt is not limited to this. For example, a rotation angle sensor that directly detects the turning angle θt may be used.

The assist command value calculating unit 43 in the above-described embodiment sets the assist command value Ta* based on the first assist component Ta1* calculated by the basic assist component calculating unit 50 and the second assist component Ta2* calculated by the angle feedback control unit 53. However, the assist command value Ta* may be set based on any other compensation component. As the compensation component, for example, a compensation component based on the change rate of the first assist component Ta1* with respect to the steering torque Th (assist gradient) may be used, or a compensation component based on a differential value for the first assist component Ta1* may be used.

The angle command value calculating unit 52 in the above-described embodiment is not limited to the one that calculates the angle command value θt1* based on the ideal model. For example, the angle command value calculating unit 52 may perform a mapping operation to calculate the angle command value θt1*. Furthermore, the input value Tin2 to the angle command value calculating unit 52 is not limited to the value resulting from subtraction of the correction value Tac from the sum of the steering torque Th and the first assist component Ta1*. For example, a value resulting from subtraction of the correction value Tac from the steering torque Th may be used.

The motor 31 in the above-described embodiment is a brushless motor. However, the motor 31 may be a motor with a brush.

According to the present invention, a variation in the response of driving support control can be suppressed.

What is claimed is:

1. A steering system comprising:
    a motor that applies an assist force to a steering mechanism of a vehicle; and
    one or more processors programmed to control driving of the motor based on an assist command value corresponding to a target value for an output torque of the motor, wherein
    the one or more processors are programmed to:
    calculate an angle command value corresponding to a target value for a turning angle for a turning wheel based on an input value including a steering torque applied to a steering wheel of the vehicle in association with a steering operation,
    calculate an assist component through execution of angle feedback control allowing an actual turning angle for the turning wheel to follow the angle command value,
    calculate the assist command value based on the assist component,
    set a state quantity command value corresponding to a target value for a state quantity indicative of a traveling state of the vehicle, and
    calculate a correction value based on a deviation between an actual state quantity of the vehicle and the state quantity command value, and wherein
    the input value is corrected based on the correction value, and
    the motor is driven to apply the assist force to the steering mechanism based on the assist command value which is calculated based on the assist component which is calculated based partly on the angle command value after the input value for the angle command value is corrected based on the correction value, such that the actual turning angle for the turning wheel follows the angle command value corresponding to the target value for the turning angle for the turning wheel.

2. The steering system according to claim 1, further comprising:
    a traveling lane detecting unit that detects information on a lane in which the vehicle is traveling;
    a vehicle speed sensor that detects a speed of the vehicle; and
    a yaw rate sensor that detects a yaw rate of the vehicle, wherein
    the one or more processors are programmed to set a target traveling line that allows the vehicle to keep traveling in the lane in which the vehicle is traveling, based on information on the lane detected by the traveling lane detecting unit, and sets a yaw rate command value corresponding to a target value for the yaw rate that enables a traveling line of the vehicle to follow the target traveling line, based on the target traveling line and the speed of the vehicle, and
    the one or more processors are programmed to calculate the correction value based on a deviation between the yaw rate command value and the yaw rate detected by the yaw rate sensor.

3. The steering system according to claim 2, wherein
    the one or more processors are programmed to set an absolute value of the correction value such that the absolute value increases as the deviation increases.

4. The steering system according to claim 1, further comprising:
    a traveling lane detecting unit that detects information on a lane in which the vehicle is traveling, wherein
    when the angle command value is defined as a first angle command value,
    the one or more processors are programmed to set a target traveling line that allows the vehicle to keep traveling in a lane in which the vehicle is traveling, based on information on the lane detected by the traveling lane detecting unit, and sets a second angle command value corresponding to a target value for a turning angle that enables a traveling line of the vehicle to follow the target traveling line, based on the target traveling line, and
    the one or more processors are programmed to use the first angle command value instead of the actual turning angle of the vehicle to calculate the correction value based on a deviation between the first angle command value and the second angle command value.

5. The steering system according to claim 4, wherein
    the one or more processors are programmed to set an absolute value of the correction value such that the absolute value increases as the deviation increases.

6. The steering system according to claim 1, wherein
    the assist component is calculated based on a difference between the actual turning angle for the turning wheel and the angle command value, where the angle command value is calculated based on the input value corrected using the correction value.

* * * * *